Aug. 23, 1966  J. P. BIRD  3,267,980
BILLFOLD AND CHECKBOOK COMBINATION
Filed Nov. 18, 1964  4 Sheets-Sheet 1
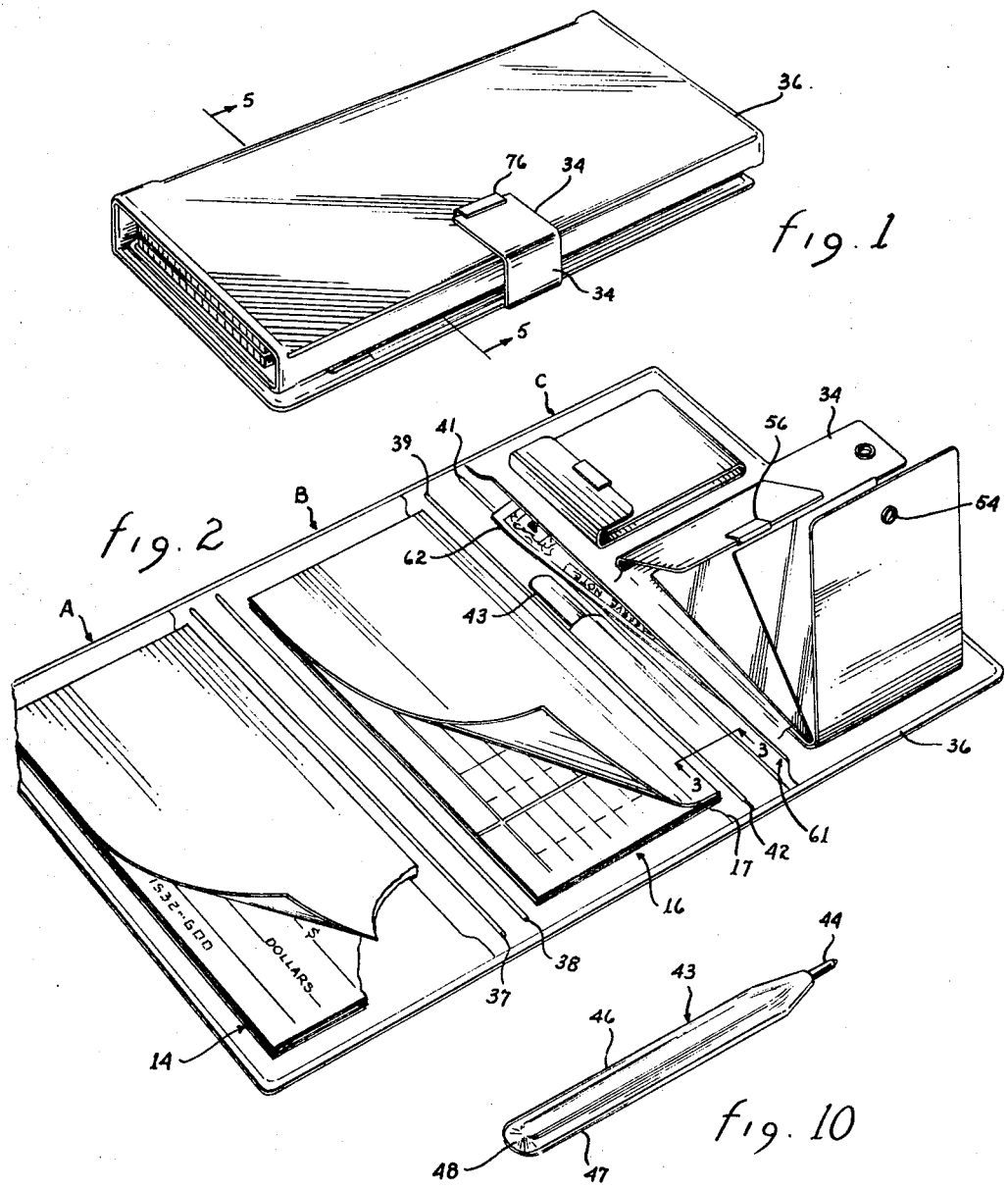
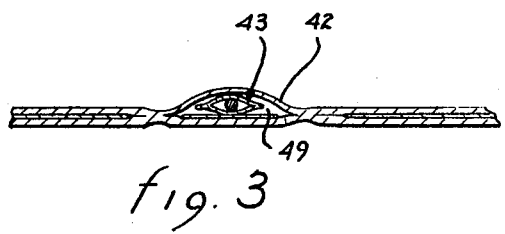
INVENTOR.
JAMES P. BIRD
BY
ATTORNEYS

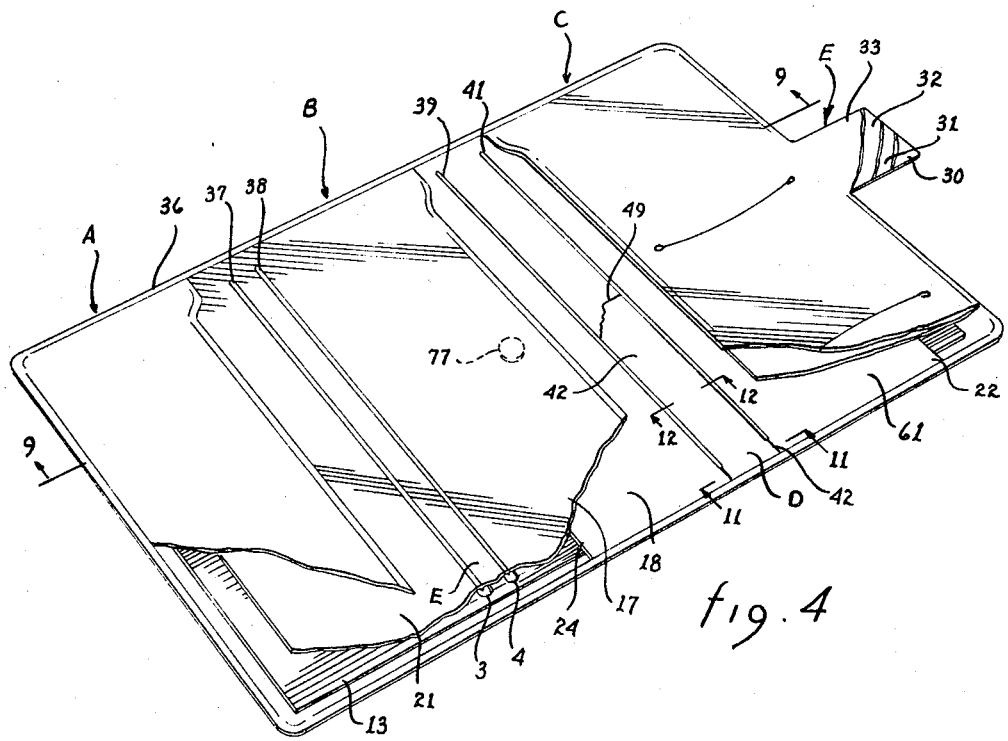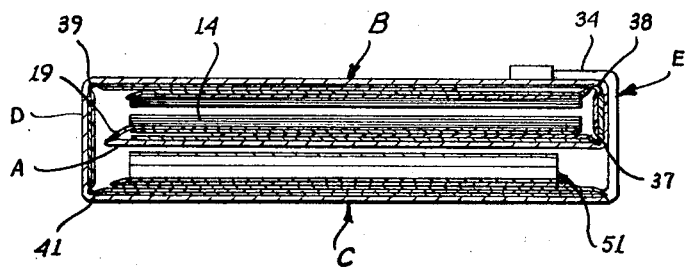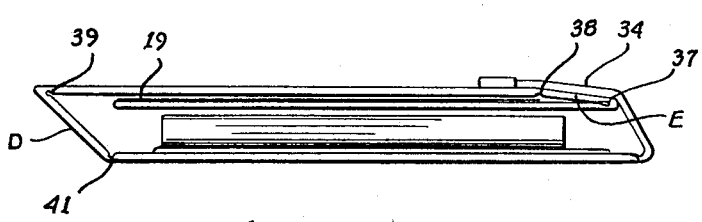

INVENTOR
JAMES P. BIRD
BY
McLaughlin, Cahill & Drummond
ATTORNEYS

Aug. 23, 1966  J. P. BIRD  3,267,980
BILLFOLD AND CHECKBOOK COMBINATION
Filed Nov. 18, 1964  4 Sheets-Sheet 4

INVENTOR.
JAMES P. BIRD
BY
ATTORNEYS

United States Patent Office 3,267,980
Patented August 23, 1966

3,267,980
BILLFOLD AND CHECKBOOK COMBINATION
James P. Bird, Scottsdale, Ariz., assignor of one-half to Edward B. Lane, Phoenix, Ariz.
Filed Nov. 18, 1964, Ser. No. 412,196
3 Claims. (Cl. 150—35)

The production of billfolds, purses, check holders and the like of various kinds is an exceedingly old art. In times past, it was almost a universal custom to employ a good grade of leather for this type of merchandise, but in recent years plastic has been substituted in great part. It is also known that with the development of increased use of checking accounts by people in the middle income bracket, checks are more commonly carried on the person, such as in a man's pocket or a woman's handbag, for the payment of mechandise as purchased. Various supposedly convenient portable, inexpensive check covers have been made, but all have serious deficiencies, particularly when they are of the so-called "dual purpose" type. When simple stubs were part of the check, they could also be carried in the same folder, but it was necessary to further encumber already filled purse or pockets with smaller purses for coins, holders for stamps, for credit cards, for identification cards and for paper currency. In many instances, the problem was solved by the use of a plurality of containing or holding devices (men frequently carry coins loose in a trousers pocket); and while the woman's purse became crowded, the man, depending on pockets, was still more inconveniently encumbered, particularly in summer weather and particularly in those parts of the country such as the Southwest where normally the coat is shed during the first part of June and not worn again until at least after Labor Day.

The number of such devices concevied to carry some combination of the various checks, check registers, currency, coins, credit cards, identification cards and the like is exceedingly large. All such devices have been objectionable in some serious way. Many have been entirely too flexible so that they will very quickly become dog-eared and provide no significant support for checks, check registers and the like forms which they were meant to carry. Checks carried in such devices for a while soon become dog-eared and almost unuseable. Almost always, also, they can accommodate only a special type of check combination designed for use with this particular holder. In still other instances, devices of this general character, when adequately strong, have been entirely too heavy, bulky and cumbersome because the designer has attempted to avoid inherent problems by merely copying a "brute force" mockup, rather than by the design of a combination unit in which the entire approach to the problem has been modified.

A principal object of my present invention is the provision of a single unit container to carry in a convenient manner all usual papers of the type identified including checks, check registers, currency, identification cards and the like.

Another object is the provision of a light-weight inherently stable and strong combination money, billfold and checkbook combination.

A further object is the provision of a combination device of the type identified formed inexpensively of relatively light-weight material but so designed and constructed that more than ample rigidity and support for the contents is obtained.

A further object is to provide rigidity by means such that articulation of the various parts is improved, and the device as a whole will function as well with very little in the way of contained material as with a complete complement of checks and other material intended to be carried.

Still another object is the provision of a receptacle type of device such as identified which can be employed equally well by both men and women without change in the style, shape or size of the device in any way.

A still further object is the provision of a checkbook and billfold combination which is readily embellished to provide a pleasing appearance and which may take different colors and designs to identify different bank institutions where such contingencies may be of importance.

A still further object is to provide a high-grade billfold and checkbook combination so inexpensive that banking institutions may purchase them in large quantities for distribution to its patrons.

Other specific objects and features of the invention will be apparent from the following detailed description taken with the accompanying drawings wherein:

FIG. 1 is a perspective view showing the checkbook and billfold combination of the present invention in folded position and containing substantially a complete complement of checks, check registers, currency, cards and other such impedimenta as may be carried in this type of receptacle;

FIG. 2 is a perspective view showing the checkbook and billfold combination in open position and with some of the parts and contents flexed to clarify the location and construction thereof;

FIG. 3 is an enlarged fragmentary sectional view taken on the line 3—3 of FIG. 2;

FIG. 4 is a perspective view similar to FIG. 2, but with the contents of the container removed, and some of the parts broken away to show structural features;

FIG. 5 is a transverse sectional view taken on the line 5—5 of FIG. 1;

FIG. 6 is an end view of the embodiment of the device shown and described, showing one way it may look when its contents have been greatly reduced;

Figure 11:
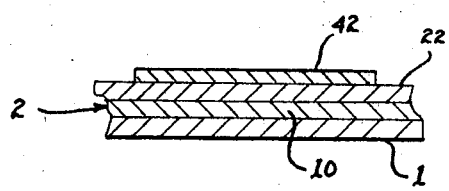
Figure 12:
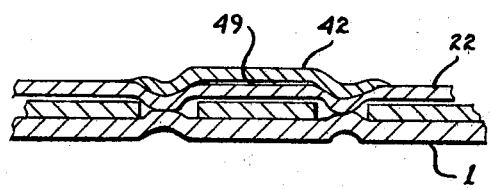

FIG. 10 is a perspective view shown full size of a special flat type of pen utilizable with the purse and contributing to its functions; and FIGS. 11 and 12 are enlarged fragmentary sectional views taken on the lines 11—11 and 12—12 respectively of FIG. 4.

While the device of the present invention may be made in different forms, the particular device shown in its exact embodiment has had very great success in actual sales and is significantly illustrative of the features and advantages of the invention. As FIG. 1 shows, the device of the present invention in folded condition readily fits into the ordinary purse carried by the housewife or career girl and also readily fits into any one of several pockets in the clothing of a man. As will be explained, it is quite rigid and form retaining in its characteristics, without being so hard and inflexible as to be a burden when carried around. It is to be understood that mere size is not indicative of invention in any respect, but for purposes of illustration it may be stated that the over-all size of the commercialized device appearing in FIG. 1 is slightly larger than the dimensions of a one dollar bill. These dimensions will vary somewhat, depending upon the contents as illustrated in FIGS. 5 and 6. Keeping in mind that size and other details are merely illustrations within the scope of the claims, a very useful form of device already in very great demand is slightly over 3¾ inches wide when fully loaded and approximately 7 inches long. Its over-all thickness when completely loaded may extend up to 1 inch or slightly more, and when the contents are down to an approximate minimum, the thickness may be of the order of ½ to ⅝ inch. Under the conditions of this extreme variation of thickness, physical integrity and adequate rigidity are maintained.

Figure 9:
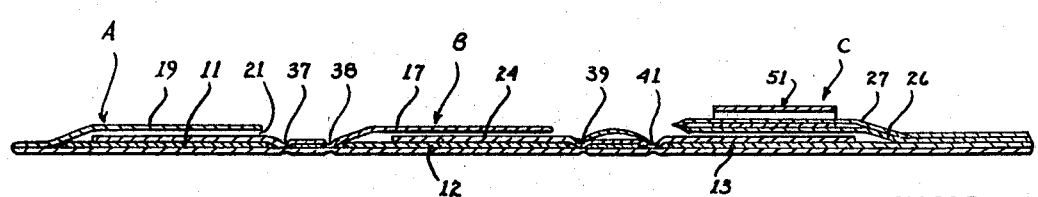
FIG. 9 is a somewhat enlarged transverse sectional view taken along the line 9—9 of FIG. 4, a card carrying member being deleted from FIG. 4 for clarity in showing the section, such card carrying member appearing in section in FIG. 9, and in perspective in both FIGS. 4 and 7.

For convenience, I shall describe a preferred manner of producing the device of the present invention at the same time that the parts of their functions of the final article are brought out. The dominant construction material is relatively thin plastic colored or surface ornamented as desired to produce a pleasing exterior. A single master sheet 1 (FIG. 7) extends over the entire outer area of the device and may be called the base lamination. Immediately above it is a fiberboard reinforcing sheet 2, with four slots 3, 4, 6 and 7 dividing the sheet into two narrow rectangular portions 8 and 9 bridging pieces 10, and three relatively firm but light weight side stiffening members identified by the reference characters 11, 12 and 13. This reinforcing sheet and rectangular side stiffening members facilitate the production of three separate firm sections which may be articulated with respect to each other and occupy approximately the same positions with respect to each other regardless of the amount of contents within the limits of the design. These three sections are indicated in FIGS. 2, 4 and 9 by the reference characters A, B and C, and they are adapted to support in this order a book of checks indicated generally by the reference character 14, a group of check registers indicated by the reference character 16, and in section C miscellanea objects as will be later described.

A second laminating sheet 17 extends over the stiffening members 11 and 12 and is secured at its edges to the edges of the base lamination 1 to form a pocket 18, which will be shown, carries check register sheets 16. A third lamination 19 extends over the second lamination 17 and is secured around three of its edges to form a pocket 21 which carries the checks 14.

A second double over-lapping lamination 22 is disposed over the reinforcing member 13 and is secured around three of its edges to contiguous edge portions of the basic lamination 1 and to part of the side portions of the second lamination 17. Its inside end 24 may be completely free but it will butt up against a reinforcing strip associated with the laminations 1 and 17 as will later be explained.

Figure 7:
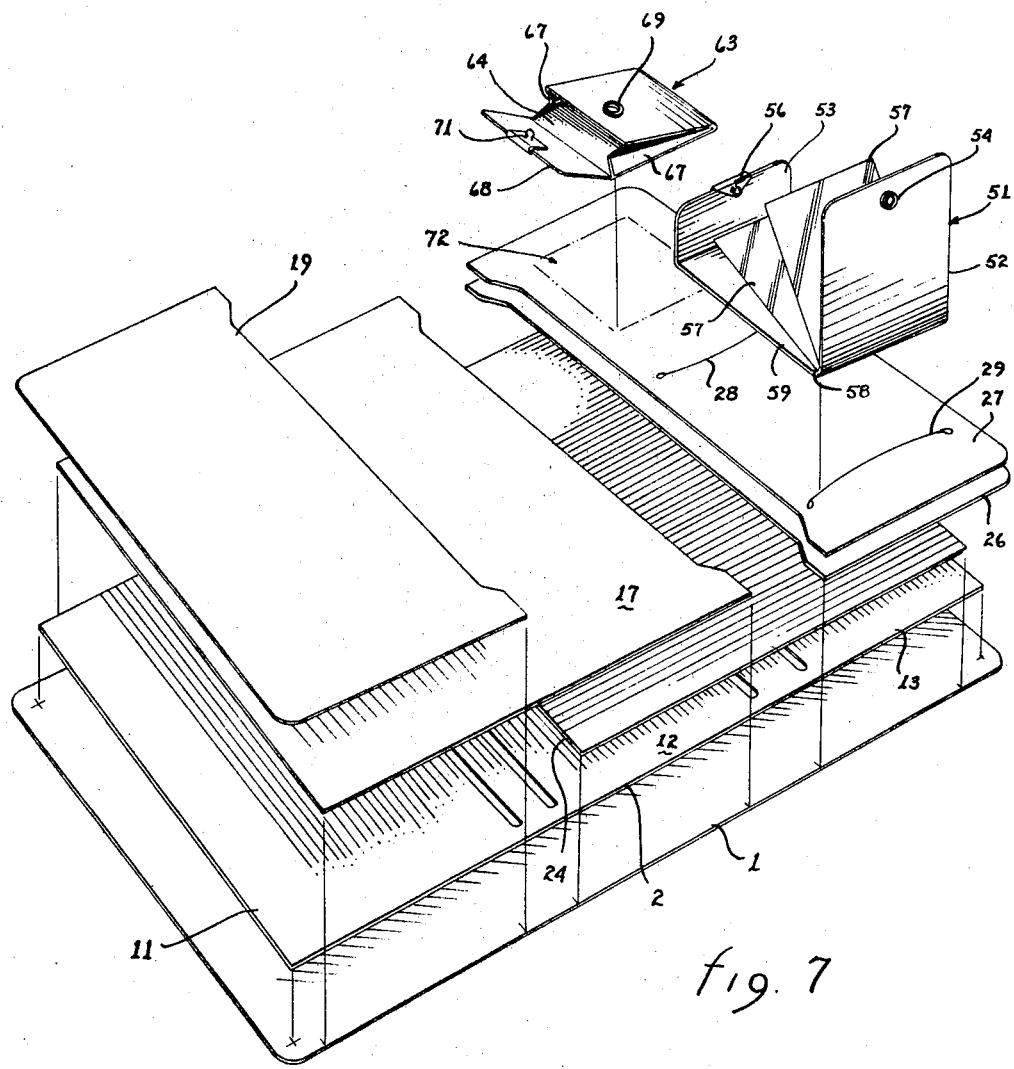
FIG. 7 is an exploded view showing the various parts making up the combination checkbook and billfold shown in the previous figures of the drawings, such parts being in the general shape which they exhibit immediately before assembly, and indicating in part the manner in which assembly is accomplished.
Figure 8:
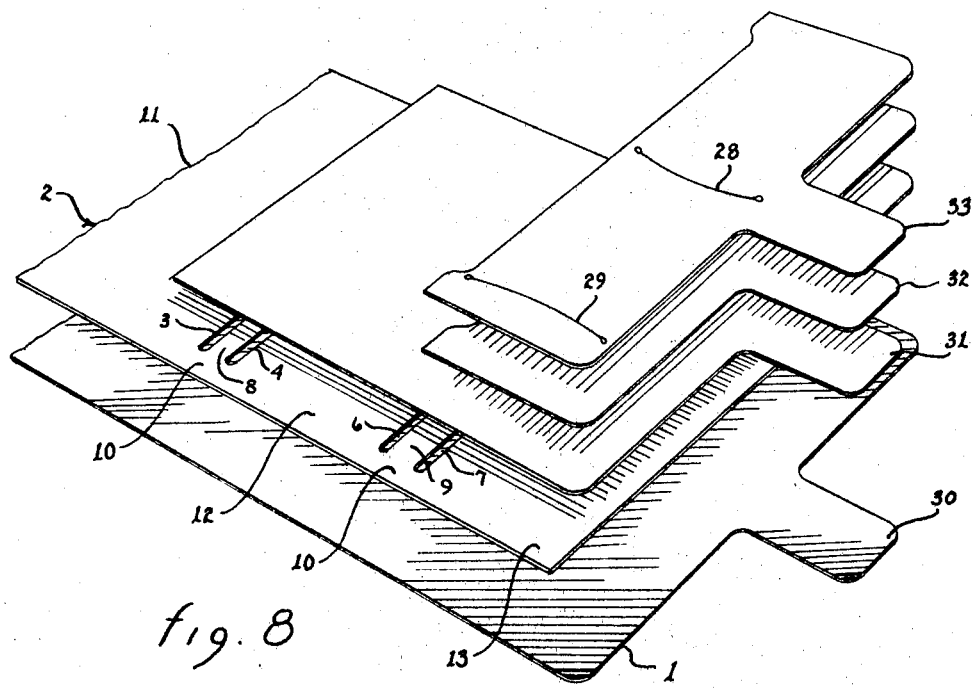
FIG. 8 is an exploded view showing only some of the parts, showing better the strengthening and reinforcing features.

A pair of superposed laminations 26 and 27 overlie that portion of the lamination 22 above the reinforcing member 13, the upper strip 27 having a pair of slits 28 and 29 as shown in FIGS. 4, 7 and 8. The base lamination 1 has a projection 30, the lamination 22 a projection 31, the strip 26 a projection 32 and the strip 27 a projection 33, all of the same general dimension and overlapping each other, so that when they are secured together they form a fastening flap or tab 34 as will be described and as particularly shown in FIGS. 1, 5 and 6.

While it may be assumed that the various parts of the purse may be assembled in separate operations to facilitate accurate control, in actual fact the parts before assembly occupy a relationship to each other as shown in FIGS. 7 and 8. When now these parts are brought together and plastic welded around their contacting edges, they form a flat production item as shown in FIG. 4. In the process of securing the plastic parts together, a bead 36 is formed entirely around the periphery of the purse to not only present a pleasing appearance but to stabilize and strengthen the entire assembly. There is no possibility that there can be any separation around the edge represented by the bead 36. At the same time, transverse beads produced by partially melting the thermoplastic material and, if desired, adding slightly to the amount of plastic material present, are formed along and through the slots 3, 4, 6 and 7 (see particularly FIGS. 8 and 12) to produce the transverse reinforcing beads 37, 38, 39 and 41. While the beads 37, 38, 39 and 41 represent thickened and reinforced portions, they are at the same time formed so as to produce articulation at each of the points represented by the beads 37 through 41, rather than at some other point. This causes the purse, when assembled, to take a rectangular shape, not rigidly so, but in such a general manner as to provide a pleasing and functionally sound arrangement. Looking at FIGS. 5 and 6, for example, it will be noted that the beads 39 and 41 are on the outside and at the left of the folded purse, while the beads 37 and 38 are on the inside of the folding purse and that both sets of beads provide for a partial collapsing of the purse as a whole without holding it in such a shape as to produce the effect of a hollow bag with no contents. In this connection, it should be noted that the space between the beads 37 and 38 is substantially narrower than the space between the beads 39 and 41, and correspondingly, the narrow rectangular stiffening portion 8 is narrower than the opposite portion 9.

From the standpoint of reinforcing the entire structure and to provide other advantages as will appear, a separate small elongated pocket forming lamination is secured between the beads 39 and 41 to carry a specially-designed pencil 43 (FIG. 10). Edges of the strip 42 are plastic welded to become parts of the beads 39 and 41, the end secured in the bead 36 forms a pocket 49. This pencil utilizes an ordinary insert 44 such as used in most types of automatic ball point pens, but instead of being held within a circular metal or plastic container, a pair of strips of plastic are placed on opposite sides thereof and welded together at 46 and 47 to produce a very flat type of pen the general shape of which can be determined by looking at the top end 48 as FIG. 10 shows. When this pen is inserted in the pocket formed by the strip 42 as shown in FIG. 2, it not only tends to reinforce the flap formed between the sections B and C by the two reinforcing beads 39 and 41 and reinforcing strip 9, but it also provides in a very accessible manner a pen for use in writing checks, filling in check registers 16, or in any other way which may be indicated in connection with the contents of the purse. In FIG. 3 the pen 43 is shown in place in the pocket 49 formed by the strip 42. FIG. 3 is only a partial section but it shows some of the other parts described particularly in connection with FIGS. 4 and 7.

A card-carrying double thickness plastic strip 51 has a top portion 52 and a closure portion 53, the former having a female member 54 of a snap fastener, the male member 56 of which is attached to the flap 53. A plurality of transparent pocket members 57 made of plastic or the like are hinged at 58 but are adapted to lie flat against the bottom flat portion 59 when the card holder formed by the strip 51 is closed and the snap fastener fastened as in FIGS. 5 and 6. The flap 53 and bottom portion 59 are adapted to be slid first through the slit 29 and then through the slit 28 as shown in FIG. 2, so that the member 29 is actually between the slits 28 and 29 and disposed between the two laminations 26 and 27. This makes for very simple assembly but produces a very rugged structure in which the card holder is firmly attached in position. The small holes at the ends of the slits 28 and 29 prevents their tearing out at their ends during insertion of the strip 51.

It will be noted particularly by reference to FIG. 2, but is also apparent in some of the other figures, that a pocket 61 is formed between the lamination 22 and the bottom of the lamination 26 and that this pocket faces inwardly toward the reinforcing bead 41. Thus, paper currency 62 or the like is readily inserted in flat position in the pocket 61 and is completely protected when the purse is folded and held together in the manner shown in FIG. 1 against possible dislodgement.

A coin purse indicated generally by the reference character 63 (note particularly FIG. 7) has a bottom portion 64, a top 66, extensible sides 67, and a closing flap 68. A female portion 69 of a common type of snap fastener is secured on the top 66 and the male portion 71 secured to the closing flap 68. The coin purse is secured in position by merely being plastic welded to a square portion 72 of the top lamination 27 so that it is completely immovable and held generally in flat relation as shown in FIG. 2.

To hold the entire purse together, the extending tab 34 is provided with one portion 76 of a snap fastener, the opposite portion 77 of the snap fastener being secured to the bottom side of the large base lamination 1 as shown in broken lines in FIG. 4. The entire purse, therefore, can be quickly secured into fully closed and releasably locked position as shown in FIG. 1 (and also as appearing in FIGS. 5 and 6) so that it can be carried around in the purse, in a pocket or in other places on one's person without danger of loss of contents.

Looking now further to the general shape and functioning of the purse combination of my present invention, I call attention to the three sections A, B and C. It will be noted that when the purse is folded as seen in FIG. 5, the section A is on the inside, the section B occupies one outside face which may be said to be the top portion, and the portion C occupies what may be called the bottom portion. The purse combination is entirely closed at one side by a relatively narrow wall D which represents that portion between the reinforcing beads 39 and 41. A corresponding portion E on the opposite side encloses only part of the side edge, leaving exposed only the check portion 14 which is valueless except as a medium on which to write a check. All the remaining portions of the purse, however, including all of the portion B and all of the portion C, with information with respect to bank balance, documents and cards, currency and all usually valuable contents are entirely enclosed except at the very end where dislodgement is almost impossible.

I have described a preferred embodiment of my invention in detail so that those skilled in the art may understand the manner of producing the same, but the scope of the invention is defined by the claims.

Those skilled in the art will understand that various modifications may be made in the invention, but still employing the same general features. The single sheet of reinforcing fiberboard separated into several units by slots through which the laminations are secured together is very advantageous, but some modifications providing a similar result may also be employed.

I claim:
1. A billfold and checkbook combination comprising
   (a) base member in the form of a relatively large rectangular plastic lamination,
   (b) a reinforcement comprising three substantially equally spaced fibrous members on said base lamination, said large rectangular lamination being divided into three parts by said reinforcing members, said parts having a center part, a left hand part and a right hand part,
   (c) a pair of intermediate laminations, each about two thirds of the length of said base lamination, said intermediate laminations overlapping at said center part to form a first pocket, and said laminations having a peripheral plastic weld to hold the same in permanent assembled relation, said first pocket adapted to contain check registers,
   (d) a first top lamination approximately covering said left part and plastic welded to said base lamination around three sides forming a second pocket for check forms or the like facing toward said center part,
   (e) a second top lamination substantially covering said right hand part and plastic welded around three sides of the base lamination to form a third pocket to hold currency and the like facing toward said center part,
   (f) two pairs of beaded score lines separating said three sections and providing reinforced side edges when the device is folded, and
   (g) releasable means for holding said device in folded relation with said three parts superposed to produce a billfold and checkbook combination about one-third the area of said base lamination.

2. The combination defined in claim 1, including a coin purse and card case carried by said second top lamination and accessible when the purse combination is partly open.

3. A billfold and checkbook combination of the type described comprising
   (a) a base lamination in the form of a relatively large rectangular plastic sheet,
   (b) means providing three substantially equally spaced reinforcing members on said base lamination, said base lamination being divided into three parts by said reinforcing members, said parts having a center part, a left hand part and a right hand part,
   (c) a pair of intermediate laminations, each about two thirds of the length of said base lamination, said intermediate laminations overlapping at said center part to form a first pocket, and said laminations having a peripheral plastic weld to hold the same in permanent assembled relation, said first pocket adapted to contain check registers,
   (d) a first top lamination approximately covering said left part and plastic welded to said base lamination around three sides forming a second pocket for checks or the like facing toward said center part,
   (e) a second top lamination substantially covering said right hand part and plastic welded around three sides of the base lamination to form a third pocket to hold currency and the like facing toward said center part,
   (f) two pairs of beaded score lines separating said three sections and providing reinforced side edges when the device is folded,
   (g) said second top lamination having top and bottom portions with a plastic welded around their peripheries leaving, however, said third pocket above an intermediate lamination for currency, said top portion of said second top lamination having a pair of generally parallel transverse slits therein, (h) a card carrier in the form of a strip of plastic extending through said slits leaving projecting tabs with a mutually releasable fastening, (i) at least one transparent card holder secured to said card carrier above said top portion, (j) an expansible snap fastener equipped coin purse plastic welded above said second top lamination adjacent to said card holder, (k) a projecting tab at an end of said base lamination at a general midpoint of said right hand part, and (l) mutually releasable fastening means between said projecting tab and a back outside face of said center part to hold said purse combination in folded relation.

References Cited by the Examiner

UNITED STATES PATENTS

| | | | |
|---|---|---|---|
| 1,561,343 | 11/1925 | Michaels | 150—38 |
| 1,694,186 | 12/1928 | L'enfant | 150—35 |
| 2,353,222 | 7/1944 | Coolbroth | 150—32 |
| 2,478,132 | 8/1948 | Schade. | |
| 2,496,144 | 1/1950 | Bauman | 150—34 X |
| 2,574,885 | 11/1951 | Niswander | 150—39 X |
| 2,647,071 | 7/1953 | Schade | 150—39 X |
| 2,869,604 | 1/1959 | Fitzsimmons | 150—39 |
| 2,875,803 | 3/1959 | Greene | 150—40 |
| 3,166,111 | 1/1965 | Markus | 150—37 X |

JOSEPH R. LECLAIR, *Primary Examiner.*

D. F. NORTON, *Assistant Examiner.*